United States Patent
Eller et al.

(12) 
(10) Patent No.: US 6,274,700 B1
(45) Date of Patent: Aug. 14, 2001

(54) CATALYST AND METHOD FOR PRODUCING POLYTETRAHYDROFURAN

(75) Inventors: Karsten Eller, Ludwigshafen; Heinz Rütter, Hochdorf-Assenheim; Michael Hesse, Worms; Rainer Becker, Bad Dürkheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/555,872

(22) PCT Filed: Dec. 10, 1998

(86) PCT No.: PCT/EP98/08038

§ 371 Date: Jun. 8, 2000

§ 102(e) Date: Jun. 8, 2000

(87) PCT Pub. No.: WO99/31164

PCT Pub. Date: Jun. 24, 1999

(30) Foreign Application Priority Data

Dec. 12, 1997 (DE) ............................................. 197 55 415

(51) Int. Cl.$^7$ .................................................. C08G 59/68
(52) U.S. Cl. .......................... 528/408; 528/413; 528/409; 502/62; 560/103; 560/240
(58) Field of Search .................................. 528/408, 409, 528/413; 502/62; 560/103, 240

(56) References Cited

U.S. PATENT DOCUMENTS

| | | | | |
|---|---|---|---|---|
| 3,358,042 | * | 12/1967 | Dunlop et al. ........................ | 568/617 |
| 3,412,039 | * | 11/1968 | Miller ..................................... | 502/81 |
| 3,433,829 | | 3/1969 | Dorfelt .................................. | 260/496 |
| 3,997,563 | * | 12/1976 | Dale et al. ............................ | 549/352 |
| 4,127,513 | * | 11/1978 | Bellis ..................................... | 528/413 |
| 4,189,566 | * | 2/1980 | Mueller et al. ....................... | 528/408 |
| 4,235,751 | * | 11/1980 | Del Pesco ............................. | 502/62 |
| 4,243,799 | | 1/1981 | Mueller et al. ....................... | 528/409 |
| 4,259,531 | * | 3/1981 | Huchler et al. ....................... | 568/617 |
| 4,480,124 | | 10/1984 | Mueller ................................. | 560/248 |
| 5,218,141 | | 6/1993 | Mueller ................................. | 560/240 |
| 5,463,020 | * | 10/1995 | Becker et al. ........................ | 528/408 |

FOREIGN PATENT DOCUMENTS

| | | |
|---|---|---|
| 195 13 493 | 3/1996 | (DE) . |
| WO 94/05719 | 3/1994 | (WO) . |

\* cited by examiner

*Primary Examiner*—Paul J. Killos
*Assistant Examiner*—Taylor V. Oh
(74) *Attorney, Agent, or Firm*—Keil & Weinkauf

(57) ABSTRACT

In a process for preparing polytetrahydrofuran, polytetrahydrofuran copolymers or diesters or monoesters thereof by polymerization of tetrahydrofuran in the presence of at least one telogen and/or comonomer over acid-activated montmorillonite catalysts, the montmorillonite catalyst after acid activation has a ratio of montmorillonite structure to the sum of muscovite and kaolin structures, determined from the intensities of the reflections at $2\theta=5.5°$ for montmorillonite, $2\theta=9.0°$ for muscovite and $2\theta=12.5°$ for kaolin measured in the X-ray powder pattern, of at least 5:1.

9 Claims, No Drawings

CATALYST AND METHOD FOR PRODUCING POLYTETRAHYDROFURAN

The present invention relates to an improved process for preparing polytetrahydrofuran, polytetrahydrofuran copolymers, diesters or monoesters of these polymers by polymerization of tetrahydrofuran in the presence of at least one telogen and/or comonomer over an acid-activated montmorillonite.

Polytetrahydrofuran (PTHF), also called polyoxybutylene glycol, is a versatile intermediate in the plastics and synthetic fiber industries and is employed, inter alia, for preparing polyurethane, polyester and polyamide elastomers, being used as a diol component for the preparation of these. Furthermore, it is, like some of its derivatives, a valuable auxiliary in many applications, for example as a dispersant or in the deinking of waste paper.

PTHF is advantageously prepared industrially by polymerization of tetrahydrofuran over suitable catalysts in the presence of reagents whose addition makes it possible to control the length of the polymer chains and thus to set the mean molecular weight to the desired value (chain termination reagents or "telogens"). This control is effected by selection of the type and amount of the telogen. In addition, selection of suitable telogens enables functional groups to be introduced at one end or both ends of the polymer chain. Thus, for example, use of carboxylic acids or carboxylic anhydrides as telogens enables the monoesters or diesters of PTHF to be prepared.

Other telogens act not only as chain termination reagents, but are also incorporated in the growing polymer chain of the PTHF; they thus have not only the function of a telogen but also that of a comonomer and can therefore be equally justifiably referred to as a telogen or as a comonomer. Examples of such comonomers are water or telogens having two hydroxyl groups, e.g. dialcohols. Examples of such dialcohols are ethylene glycol, butylene glycol, 1,4-butanediol, 1,6-hexanediol, or low molecular weight PTHF. Further suitable comonomers are 1,2-alkylene oxides such as ethylene oxide or propylene oxide, 2-methyltetrahydrofuran or 3-methyltetrahydrofuran. The use of such comonomers leads, with the exception of water, 1,4-butanediol and low molecular weight PTHF, to the preparation of tetrahydrofuran copolymers. The PTHF can be chemically modified in this way. An example of this is the use of the telogen 2-butyne- 1,4-diol whose addition leads to the presence of a proportion of C≡C triple bonds in the polymer chain of the PTHF. PTHF modified in this way can be further modified chemically at these points as a result of the reactivity of these triple bonds, for example by hydrogenation of the triple bonds to double bonds, by subsequent grafting of other monomers to adjust the properties of the polymer, crosslinking for building up polymers having a comparatively rigid structure, or other customary procedures of polymer chemistry. The complete hydrogenation of the triple bonds present is likewise possible and generally leads to PTHF having a particularly low color number.

DE-A-1 226 560 describes a process for preparing polytetrahydrofuran diacetates. These are obtained by polymerization of tetrahydrofuran (PTHF) in the presence of bleaching earth as catalyst. In particular, use is made of aluminum hydrosilicates or aluminum magnesium silicates of the montmorillonite type, which can be activated by means of acid. By way of example, an acid montmorillonite having the trade name "Tonsil®" is used. Acetic anhydride is used as telogen.

Use of the montmorillonites as described in DE-A-1 226 560 gives PTHF diacetates which have a relatively high APHA color number. If a product having a low color number is desired, the mixture obtained as described in DE-A-1 226 560 has to be subjected to additional purification steps.

WO94/05719 relates to a process for preparing polytetramethylene ether glycol diesters using a catalyst of the aluminum silicate type. Instead of known natural montmorillonites, use is made of amorphous aluminum silicates or zeolites and also acid-activated and calcined kaolins.

According to DE-A-195 13 493, acid-activated magnesium aluminum hydrosilicates of the attapulgite type are used as catalyst for preparing polytetramethylene ether glycol diesters. The use of these catalysts in place of the known montmorillonite, zeolite or kaolin catalysts is said to lead to higher polymerization rates and more uniform properties and a narrow molecular weight distribution of the polymers obtained.

However, the known catalyst systems still do not have sufficient activity for industrial implementation of the process, in particular when using technical-grade THF.

It is an object of the present invention to provide a catalyst for a PTHF process which makes it possible to achieve higher polymer yields at a lower color number of the PTHF obtained, since the economics of a heterogeneously catalyzed PTHF process are critically dependent on the productivity of the catalyst and on the purity of the products obtained.

We have found that this object is achieved by a process for preparing polytetrahydrofuran, polytetrahydrofuran copolymers or diesters or monoesters thereof by polymerization of tetrahydrofuran in the presence of at least one telogen and/or comonomer over acid-activated montmorillonite catalysts, wherein the montmorillonite catalyst after acid activation has a ratio of montmorillonite structure to the sum of muscovite and kaolin structures, determined from the intensities of the reflections at $2\theta=5.5°$ for montmorillonite, $2\theta=9.0°$ for muscovite and $2\theta=12.5°$ for kaolin measured in the X-ray powder pattern, of at least 5:1.

In the acid-activated montmorillonites of the prior art, there are no montmorillonites or only a very small proportion of montmorillonites present in the montmorillonite structure after acid activation. The proportion of the catalyst which can be detected by X-ray diffraction consists predominantly or completely of the muscovite or kaolin structure. In addition, there are X-ray-amorphous constituents and natural impurities such as quartz.

According to the present invention, it has been found that montmorillonite catalysts can be used particularly advantageously in the preparation of polytetrahydrofuran or polymers derived therefrom if the ratio of montmorillonite structure to other structures after acid activation is large. Such catalysts have a high activity and selectivity, so that polytetrahydrofurans which have a low color number are also obtainable from technical-grade THF. Prepurification of the THF as described, for example, in DE-A-28 01 792 or hydrogenation to reduce the color number as described, for example, in EP-A-0 061 668 is not necessary according to the present invention.

The catalysts used according to the present invention are selected and activated with acid in such a way that after acid activation the ratio of montmorillonite structure to the sum of muscovite and kaolin structures, determined from the intensities of the reflections at $2\theta=5.5°$ for montmorillonite, $2\theta=9°$ for muscovite and $2\theta=12.5°$ for kaolin measured in the X-ray powder pattern, is at least 5:1, preferably at least 7.5:1, particularly preferably at least 20:1. Compared to the known catalysts which contain little if any montmorillonite structure, such catalysts have the abovementioned advantages.

The measurement by X-ray powder diffraction is carried out in customary ways, using copper $K_\alpha$ radiation. The angles given for the reflections can vary slightly depending on the apparatus and measurement method used. The procedure for carrying out the determination is known to those skilled in the art.

The montmorillonite catalyst preferably has more than 90% by weight of its crystalline constituents in the form of montmorillonite, muscovite and kaolin structures. Particularly preferably, the catalyst consists essentially or completely of montmorillonite, muscovite and kaolin structures. The proportion of other sheet structures or of quartz should be as low as possible.

The surface area of the montmorillonite catalyst is preferably at least 150 $m^2/g$, particularly preferably at least 200 $m^2/g$. It is determined by the BET method.

The montmorillonites used according to the present invention belong to the group of clays, more specifically to the class of smectites. For the process of the present invention, the montmorillonites can be either of natural origin or of synthetic origin. Preference is given to using natural montmorillonites which have a very high proportion of montmorillonite structure.

Before use in the process of the present invention, the montmorillonite catalysts are activated in acid. The activation can be carried out by methods as are described, for example, in DE-A-10 69 583 or EP-A-0 398 636. The acid activation can be carried out using various acids; preference is given to the customary mineral acids or organic carboxylic acids. The acids are preferably selected from the group consisting of hydrochloric acid, sulfuric acid, nitric acid, phosphoric acid, formic acid or citric acid. Particular preference is given to sulfuric acid and/or hydrochloric acid.

For the acid activation, the pulverulent montmorillonite is suspended in the acid, with the solids content of the suspension preferably being from 1 to 70% by weight, particularly preferably from 20 to 60% by weight, based on the total weight of the suspension. The acid concentration depends on the acid used and on the type of clay employed. It can vary greatly and is preferably in the range from 2 to 100%. In the case of sulfuric acid and hydrochloric acid, preference is given to using a concentration of from 20 to 50%. The suspension is reacted while stirring at a temperature of preferably from 30 to 120° C., particularly preferably from 50 to 110° C., for preferably from 0.5 to 24 hours, particularly preferably from 2 to 15 hours. The acid-activated montmorillonite is then separated off, for example by filtration. To remove adhering traces of acid, it is subsequently washed with distilled or deionized water and then dried or calcined. The montmorillonite catalysts are advantageously dried at atmospheric pressure and temperatures of from 80 to 200° C., preferably from 100 to 150° C., for from 1 to 20 hours. It is also possible to carry out drying under reduced pressure and at lower temperatures. The dried catalysts are preferably calcined at from 150 to 600° C., particularly preferably from 200 to 500° C., in particular from 300 to 500° C., for from 0.5 to 12 hours, preferably from 1 to 5 hours. However, the acid activation can also be carried out in other ways which are known per se. For example, the acid can be brought into contact with the catalyst by spraying or kneading with simultaneous shaping.

The acid treatment preferably washes the catalyst free of alkali metal ions. The finished catalyst preferably contains less than 4% by weight, more preferably less than 3% by weight, based on the total weight of the catalyst, of alkali metal oxides (determined after ignition at 900° C.) in order to ensure a high activity.

Since water can, as telogen, copolymerize with THF, drying and/or calcination of the montmorillonite catalysts under the above conditions prior to use is advisable when telogens/comonomers other than water are used.

The catalysts which can be employed according to the present invention can be used for the polymerization of THF by the process of the present invention in the form of powders, for example when carrying out the process in suspension, or advantageously as shaped bodies, e.g. in the form of cylinders, spheres, rings or granules, in particular when the catalyst is arranged in a fixed bed, which is preferred when using, for example, loop reactors when the process is being operated continuously.

In the preparation of PTHF diesters, suitable telogens, i.e. substances which effect chain termination of the polymerization reaction, are carboxylic anhydrides derived from $C_2$-$C_{20}$- monocarboxylic acids, for example acetic anhydride, propionic anhydride and butyric anhydride. The PTHF diesters formed when using these telogens can be converted into PTHF by various methods (e.g. as described in U.S. Pat. No. 4,460,796).

As telogens for preparing PTHF monoesters of monocarboxylic acids, use is generally made of $C_1$-$C_{20}$-monocarboxylic acids, particularly preferably formic acid, acetic acid, propionic acid, 2-ethylhexanoic acid, acrylic acid and methacrylic acid.

A suitable telogen for preparing copolymers of THF is, for example, 1,4-butynediol. The resulting copolymer can subsequently be converted into PTHF by hydrogenation of the triple bonds, but displays interesting properties even as such.

Other copolymers of THF can be obtained by use of 1,2-alkylene oxides, preferably ethylene oxide or propylene oxide, 2-methyltetrahydrofuran, 3-methyltetrahydrofuran or diols such as ethylene glycol or 1,6-hexanediol.

When using the telogens water and/or 1,4-butanediol, the process of the present invention gives PTHF in one step. If desired, a low molecular weight, open-chain PTHF having a molecular weight of from 200 to 700 dalton can also be returned as telogen to the polymerization reaction where it is converted into higher molecular weight PTHF. Since 1,4-butanediol and low molecular weight PTHF have two hydroxyl groups, they are incorporated not only as telogen at the ends of the PTHF chain but also into the PTHF chain as monomer.

The telogen is advantageously fed to the polymerization as a solution in THF. Since the telogen effects the termination of the polymerization, the mean molecular weight of the PTHF or PTHF diester can be controlled via the amount of telogen used. The more telogen present in the reaction mixture, the lower the mean molecular weight of the PTHF or respective PTHF derivative formed. Depending on the telogen content of the polymerization mixture, PTHFs or PTHF derivatives having mean molecular weights of from 250 to 10,000 dalton can be prepared in a targeted way. The process of the present invention is preferably used to prepare PTHFs or PTHF derivatives having mean molecular weights of from 500 to 10,000 dalton, particularly preferably from 650 to 5000 dalton. The polymerization is generally carried out at from 0 to 80° C., preferably from 25° C. to the boiling point of THF. The pressure employed is generally not critical to the polymerization result, which is why the reaction is generally carried out at atmospheric pressure or under the autogenic pressure of the polymerization system. Exceptions are copolymerizations of THF with the volatile 1,2-alkylene oxides, which are advantageously carried out under superatmospheric pressure.

The pressure is usually from 0.1 to 20 bar.

To avoid the formation of ether peroxides, the polymerization is advantageously performed under an inert gas atmosphere. As inert gases, it is possible to use, for example, nitrogen, carbon dioxide or the noble gases. Preference is given to using nitrogen.

The polymerization is particularly advantageously carried out under a hydrogen atmosphere. This embodiment gives a particularly low color number of the polymers formed. The hydrogen partial pressure can be from 0.1 to 50 bar. When the polymerization is carried out in the presence of hydrogen, the color number can be further improved by doping the montmorillonite with transition metals of groups 7 to 10 of the Periodic Table, for example with ruthenium, rhenium, nickel, iron, cobalt, palladium and/or platinum.

The process of the present invention can be operated batchwise or continuously. For economic reasons, the continuous mode of operation is generally preferred.

In the batchwise mode of operation, the reactants THF, the respective telogen and the catalyst are generally reacted in a stirred vessel or loop reactor at the temperatures indicated until the desired conversion of the THF has been reached. Depending on the amount of catalyst added, the reaction time can be from 0.5 to 40 hours, preferably from 1 to 30 hours. The catalysts are generally added to the polymerization in an amount of from 1 to 90% by weight, preferably from 4 to 70% by weight and particularly preferably from 8 to 60% by weight, based on the weight of the THF used.

For the work-up, the reaction product in the case of the batchwise mode of operation is separated from the catalyst present therein, advantageously by filtration, decantation or centrifugation. The polymerization product freed of the catalyst is generally worked up by distillation; advantageously, unreacted THF is distilled off and then, if desired, low molecular weight PTHF oligomers are removed from the polymer by distillation under reduced pressure.

The catalysts which are particularly active in the process of the present invention have a montmorillonite content which is higher than usual. Although the catalysts previously known for the polymerization of THF, e.g. Tonsil®, K 10®, KSF®, KP 10®, etc. are prepared from montmorillonites by acid activation, the sheet structure can be severely attacked, inter alia, by the process of activation (Brown, Geol. Carp. 45 (1994) 45–50, Rhodes and Brown, J. Chem. Soc., Faraday Trans. 88 (1992) 2269–2274, Kumar et al., Ind. Eng. Chem. Res. 34 (1995) 1440–1448), so that virtually no montmorillonite structure can be detected by X-ray diffraction. Apart from the formation of X-ray-amorphous particles, there is also partial conversion to muscovite as a result of the activation. The montmorillonite customarily used for the activation also has an insufficient montmorillonite content. For the purposes of the present invention, the measure of the montmorillonite content is the 001 line of the powder diffraction pattern at about $2\theta=5.5°$. In order to eliminate errors caused by different measurement conditions, the montmorillonite content is expressed as a ratio to muscovite and to the kaolin constituents which frequently occur in natural clays.

EXAMPLES

XRD Method

The X-ray determination of the montmorillonite content was carried out from the powder diffraction patterns using the 001 line of montmorillonite at about $2\theta=5.5°$ the muscovite line at about $2\theta=9°$ and the kaolin line at about $2\theta=12.5°$. The measurement conditions were:

Siemens D 5000 powder diffractometer
Cu $K_\alpha$ line
Measurement using a variable aperture
Steps of $0.02°$
3.6 s measurement time per step The diffraction patterns were evaluated by determining the area after subtracting the base line. Depending on the preparation, there will be slight deviations in the relative ratios, so that the method is subject to a certain error. The water content in particular is relevant in the low angle region and has to be kept constant for samples which are to be compared.

Preparation of Catalyst
Catalyst C1

Comparative Example

Catalyst C1 was a montmorillonite which had been activated with hydrochloric acid and had a ratio of montmorillonite to muscovite to kaolin of 0:1:0.2, i.e. the original montmorillonite structure could no longer be detected by X-ray diffraction after acid activation. The $Na_2O$ content was 0.3% by weight, the $K_2O$ content was 1.75% by weight, in each case measured after ignition at 900° C.

Catalyst C2

Comparative Example

Catalyst C2 was an acid-activated montmorillonite (Tonsil Optimum 210 FF from Sudchemie) which had a ratio of montmorillonite to muscovite to kaolin of 0.4:1:0.2. The $Na_2O$ content was 0.36% by weight, the $K_2O$ content was 2.0% by weight, in each case measured after ignition at 900° C.

Catalyst A

Catalyst A was a montmorillonite which had been activated with hydrochloric acid and had a ratio of montmorillonite to muscovite to kaolin of 23.7:1:2.1, i.e. the ratio of montmorillonite to the sum of muscovite and kaolin was 7.5:1. The $Na_2O$ content was 0.26% by weight, the $K_2O$ content was 0.91% by weight, in each case measured after ignition at 900° C.

Catalyst B

Catalyst B was a montmorillonite which had been activated with hydrochloric acid and had a ratio of montmorillonite to muscovite to kaolin of 28.0:1:1.5, i.e. the ratio of montmorillonite to the sum of muscovite and kaolin was 11.1:1. The $Na_2O$ content was 0.06% by weight, the $K_2O$ content was 0.16% by weight, in each case measured after ignition at 900° C.

Catalyst C

Catalyst C was a montmorillonite which had been activated with hydrochloric acid and had a ratio of montmorillonite to muscovite to kaolin of 92.9:1:3.3, i.e. the ratio of montmorillonite to the sum of muscovite and kaolin was 21.8:1. The $Na_2O$ content was 0.05% by weight, the $K_2O$ content was 0.17% by weight, in each case measured after ignition at 900° C.

Polymerization 182 g of tetrahydrofuran and 18 g of acetic anhydride are placed in a 500 ml stirred flask and heated to 50° C. Whilst stirring (180 rpm), 10 g of catalyst are added thereto and the mixture is stirred for 45 minutes at 50° C. The catalyst is subsequently filtered off by means of a pressure filter. The color number of the filtrate is determined and the filtrate is then evaporated on a rotary evaporator (30 min at 150° C./1013 mbar and 30 min at 150° C./0.2–0.3 mbar). The PTHF obtained in this way is weighed to determine the conversion.

The results obtained are shown in the table.

TABLE 1

| Catalyst | Conversion [%] | Color number of filtrate [APHA] |
|---|---|---|
| C1 | 28.9 | 15 |
| C2 | 8.3 | 25 |
| A | 28.9 | 10 |
| B | 40.5 | 11 |
| C | 44.2 | 8 |

The experiments show that conversions and color number are significantly improved as the montmorillonite content increases.

We claim:

1. A process for preparing polytetrahydrofuran, polytetrahydrofuran copolymers or diesters or monoesters thereof by polymerization of tetrahydrofuran in the presence of at least one telogen and/or comonomer selected from water, 1,4-butanediol, 2-butyne-1,4-diol, polytetrahydrofuran having a molecular weight of from 200 to 700, a $C_1$–$C_{20}$-monocarboxylic acid, a carboxylic anhydride of a $C_2$–$C_{20}$-monocarboxylic acid, 2- or 3-methyltetrahydrofuran, a diol or a mixture of these telogens and/or comonomers over acid-activated montmorillonite catalysts, wherein the montmorillonite catalyst after acid activation has a ratio of montmorillonite structure to the sum of muscovite and kaolin structures, determined from the intensities of the reflections at $2\theta=5.5°$ for montmorillonite, $2\theta=9.0°$ for muscovite and $2\theta=12.5°$ for kaolin measured in the X-ray powder pattern, of at least 5:1.

2. A process as claimed in claim 1, wherein more than 90% by weight of the crystalline components of the montmorillonite catalyst are in the form of montmorillonite, muscovite and kaolin structures.

3. A process as claimed in claim 1, wherein the surface area of the montmorillonites is at least 200 $m^2/g$, determined by the BET method.

4. A process as claimed in claim 1, wherein the montmorillonite catalyst is calcined at from 200 to 500° C. prior to use in the polymerization.

5. A process as claimed in claim 1, wherein the acid activation is carried out using an acid selected from the group consisting of hydrochloric acid, sulfuric acid, nitric acid, phosphoric acid, formic acid or citric acid.

6. A process as claimed in claim 1, wherein the catalyst contains less than 3% by weight, based on the total weight of the catalyst, of alkali metal ions.

7. A process as claimed in claim 1, wherein the telogen used is acetic anhydride.

8. A process as claimed in claim 1, wherein the polymerization is carried out at from 20 to 80° C. and a pressure in the range from 0.5 to 3 bar.

9. A process as claimed in claim 1, wherein the polymerization is carried out in the presence of hydrogen.

* * * * *